US 6,739,825 B2

(12) United States Patent
Beck et al.

(10) Patent No.: US 6,739,825 B2
(45) Date of Patent: May 25, 2004

(54) UNDERFLOOR LIFTS

(75) Inventors: Adam Beck, Warley (GB); Alan James Ford, Warley (GB)

(73) Assignee: Passenger Lift Services Limited, West Midlands (GB)

( * ) Notice: Subject to any disclaimer, the term of this patent is extended or adjusted under 35 U.S.C. 154(b) by 0 days.

(21) Appl. No.: 10/114,008

(22) Filed: Mar. 28, 2002

(65) Prior Publication Data

US 2002/0149007 A1 Oct. 17, 2002

(30) Foreign Application Priority Data

Apr. 12, 2001 (GB) ............................................. 0109224

(51) Int. Cl.7 ............................... A61G 3/06; A61G 3/08
(52) U.S. Cl. .................... 414/558; 414/549; 414/921
(58) Field of Search ....................... 414/549, 558, 414/921

(56) References Cited

U.S. PATENT DOCUMENTS 4,058,228 A  * 11/1977 Hall ........................... 414/549
4,579,503 A  *  4/1986 Disque ........................ 414/558
5,556,250 A  *  9/1996 Fretwell et al. .............. 414/558
6,024,528 A  *  2/2000 Taylor ......................... 414/495

FOREIGN PATENT DOCUMENTS

| CA | 2110137 | * | 5/1995 |
| GB | 2224992 | * | 5/1990 |
| NL | 1008169 C | | 8/1999 |

* cited by examiner

Primary Examiner—Steven A. Bratlie
(74) Attorney, Agent, or Firm—Christensen, O'Connor, Johnson, Kindness PLLC

(57) ABSTRACT

An underfloor lift assembly (1) includes a saddle member (3) fully mounted in an underfloor cavity (3a) and adapted slidably to receive a stowage box (4). The stowage box (4) provides a further location for a lifting mechanism (5), in a stowed condition. In use, the lifting mechanism (5) is extended in a telescopic manner from the stowage box (4). Concomitantly, the stowage box (4) is extended in a telescopic manner from the saddle member (3).

17 Claims, 4 Drawing Sheets

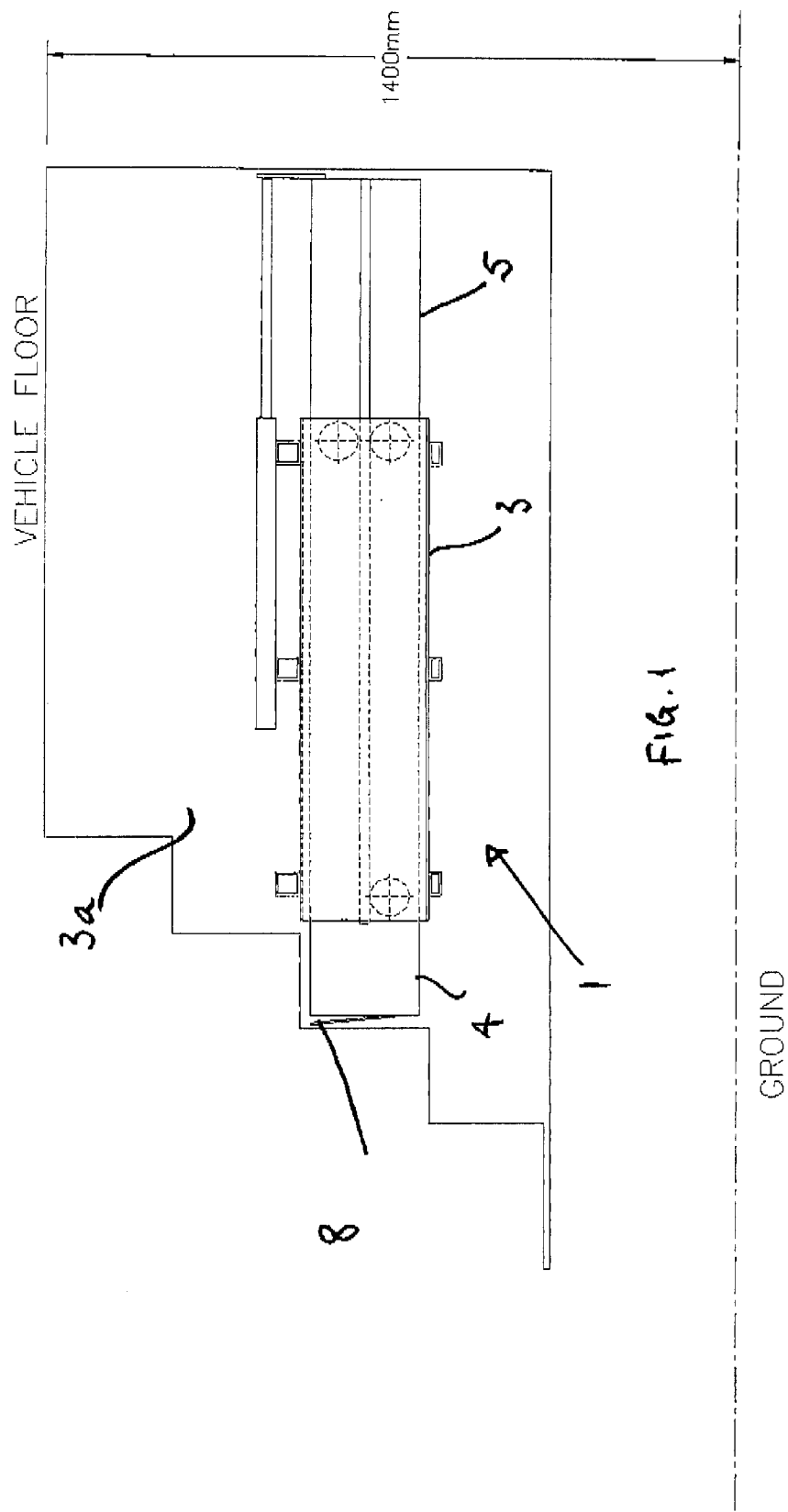

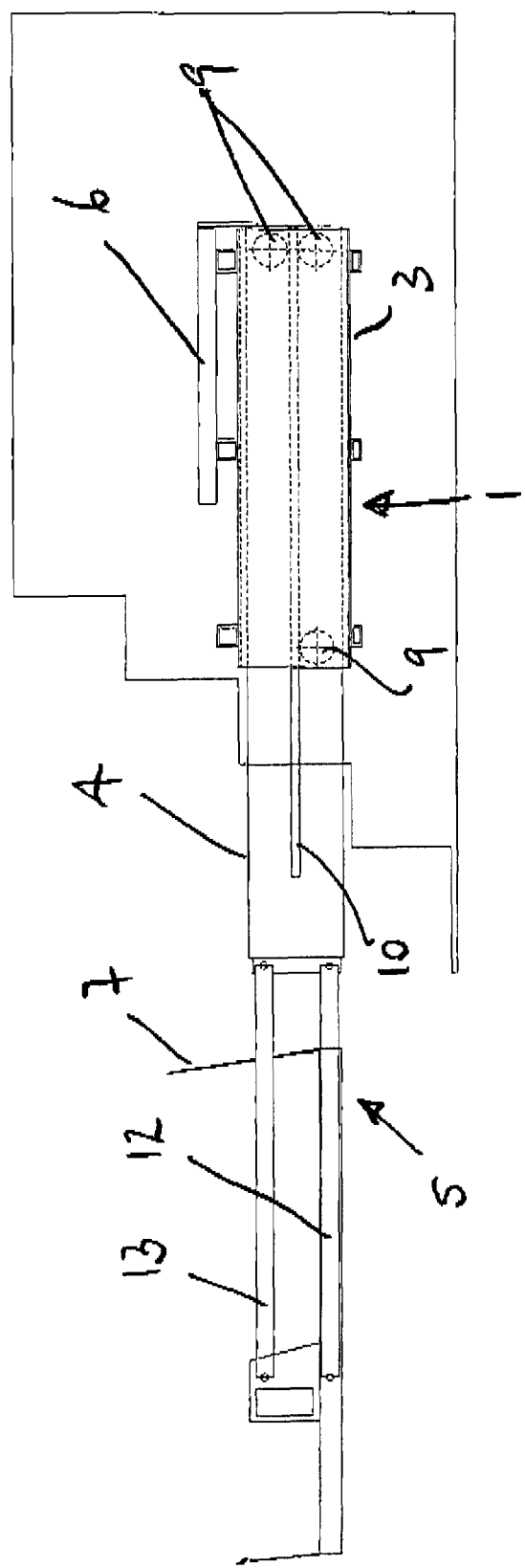

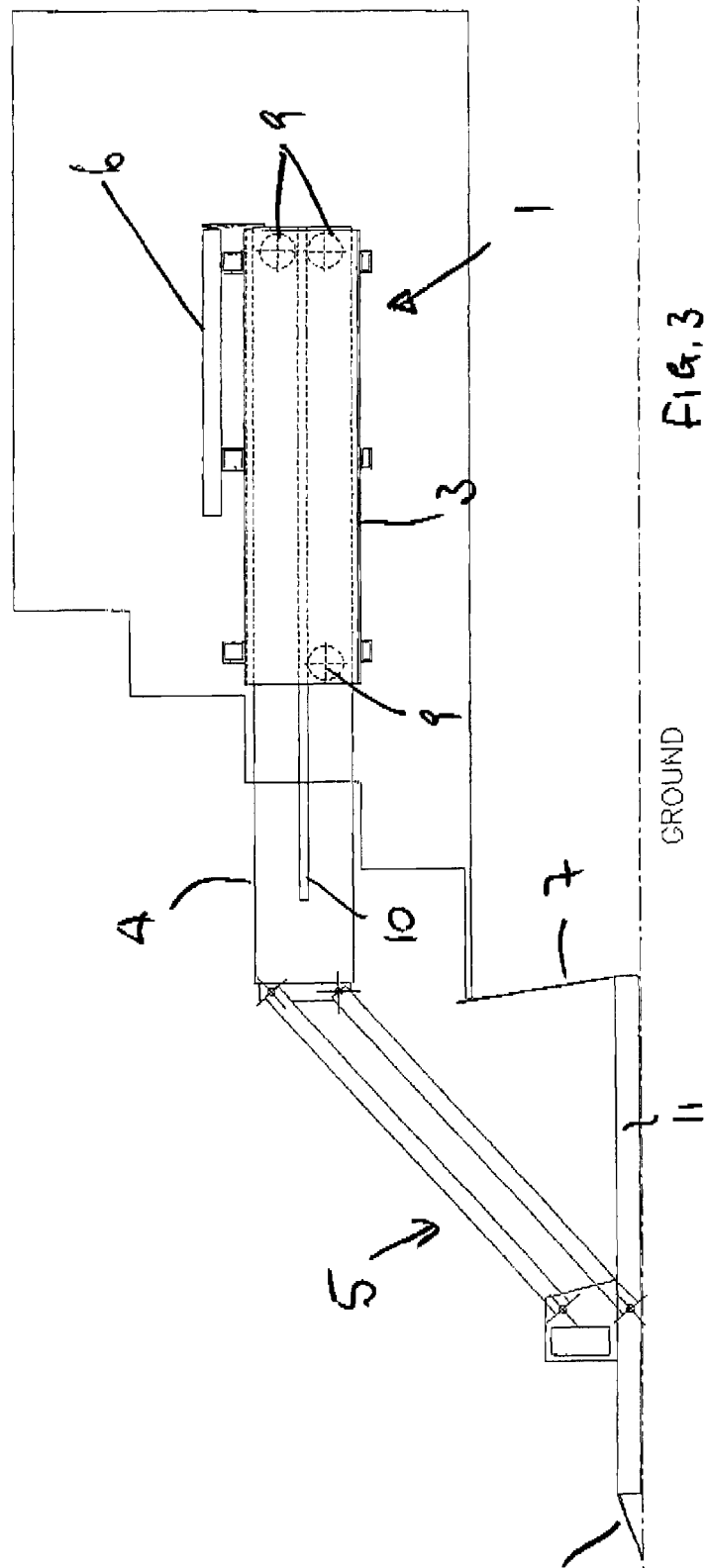

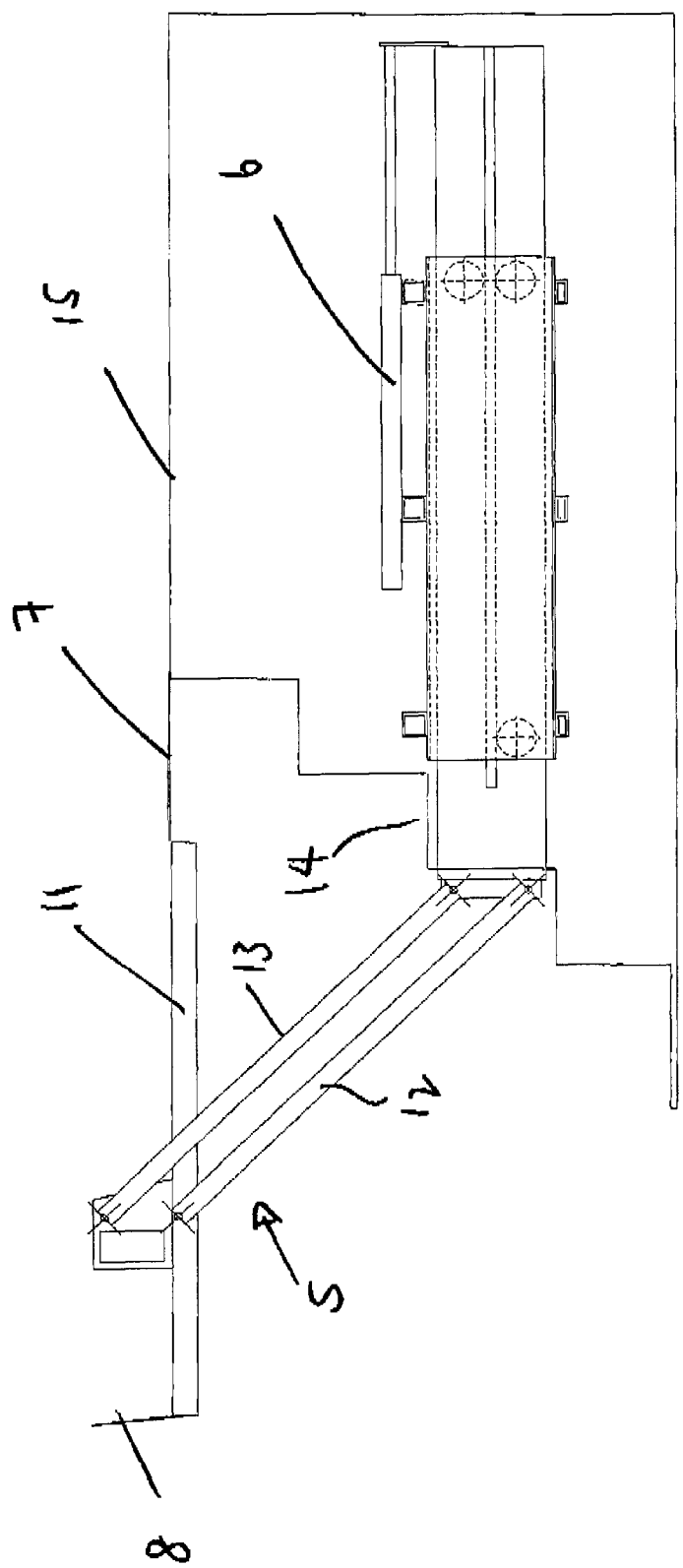

UNDERFLOOR LIFTS

BACKGROUND OF THE INVENTION

This invention relates to underfloor lifts, and particularly, though not exclusively, to underfloor passenger lifts for use in association with coaches and similar vehicles.

1. Field of the Invention
2. Description of Related Art

Underfloor passenger lifts are known and generally include a stowage box which is fixedly mounted beneath the floor of the vehicle. A load-carrying platform is mounted on a carriage which can be moved inwardly and outwardly of the stowage box, the platform being stowed away in the box when not in use and being presented for use when out of the box. Movement of the platform is provided by a lifting mechanism, which is conveniently operated hydraulically.

The platform is provided, at one or both ends, with a hinged bridging-plate. When the platform is deployed, the bridging-plate extends from the platform to the ground or to the interior of the vehicle (as the case may be).

Underfloor lifts as described in the two immediately-preceding paragraphs will hereinafter be referred to as "underfloor lifts (as hereinbefore defined)".

Current underfloor lifts generally require relatively large bridging-plates associated with their respective platforms, because of the potentially large gap between a raised platform and a floor of a coach. The large gap becomes more of a problem when the height of the coach floor relative to the ground exceeds about 3 to 4 feet, as is found, for example, on coaches of the type used for lengthy journeys (e.g. in North America). In such cases, the height of the raised platform above the ground can cause anxiety to the person on the platform.

It is an aim of the present invention to ameliorate the above-mentioned problems by permitting the decrease of the gap between the platform and the coach floor.

BRIEF SUMMARY OF THE INVENTION

Accordingly, the present invention provides an underfloor lift (as hereinbefore defined) further comprising a saddle member fixedly mounted under the floor of the vehicle to receive the stowage box together with its associated platform and lifting mechanism, in sliding engagement.

The saddle member may conveniently be of substantially quadrilateral section. The saddle member may therefore be substantially parallelepiped, (including rhomboid and cuboid), in configuration. Alternatively, the saddle member may be substantially trapezoid in configuration.

The stowage box is preferably of complementary configuration to the saddle member, to enable it to be received by the saddle member in sliding engagement. The saddle member may be fixedly attached to the underfloor of the coach (or to a cavity provided therein) by means of bolts, screws, rivets, adhesives, welding or the like.

The stowage box is, in use, moveable substantially longitudinally relative to the saddle member.

The stowage box may be received and located by means of roller bearings provided on the saddle member. The stowage box preferably has one or more external rails, each of which is located by said roller bearings.

Sliding movement of the stowage box relative to the saddle member may be achieved by means of a hydraulically-actuated piston mounted on the saddle member. Alternatively, a pneumatically-actuated piston or linear actuator may be used. Alternatively, a rack and pinion assembly may also be used to move the stowage box.

The lifting mechanism is slidably extended from and received into the stowage box by means of a hydraulically-actuated piston. Alternatively, a pneumatically-actuated piston may be used. Alternatively, a gear system may be used in operative association with the stowage box.

The load-bearing platform is supported on the lifting mechanism for pivotal movement.

In the operation of a lift according to the present invention, the movement of the stowage box outwardly of the saddle member (and hence outwardly of the coach) enables the platform, when raised to the level of the entrance of the coach, to be deployed at a relatively short distance from the coach. Accordingly, only a relatively short bridging-plate will be needed to span the gap between the platform and the coach.

The bridging-plate may be deployed relative to the platform by means of an electric motor. Alternatively, the bridging-plate may be deployed by means of a pneumatically-actuated piston or a hydraulically-actuated piston.

The load-bearing platform may further comprise a ramp stop, which may be operated by means of an electric motor, a pneumatically-actuated piston or a hydraulically-actuated piston.

A preferred embodiment of the present invention will be illustrated, merely by way of example, with reference to the accompanying drawings, in which:

BRIEF DESCRIPTION OF THE DRAWINGS

FIG. 1 shows an underfloor lift in accordance with the present invention, in a stowed condition;

FIG. 2 shows the lift of FIG. 1 in an extended, intermediate condition;

FIG. 3 shows the lift of FIG. 1 in a lowered, first, operative condition; and

FIG. 4 shows the lift of FIG. 1 in a raised, second, operative condition.

DETAILED DESCRIPTION OF THE INVENTION

Referring to FIG. 1, an underfloor lift assembly 1 comprises a saddle member 3 fixedly mounted in an underfloor cavity 3a and adapted slidably to receive a stowage box 4. Said stowage box 4 provides a further location for a lifting mechanism 5, in a stowed condition.

Upon activation, the lifting mechanism 5 is extended in a telescopic manner from the stowage box 4. Concomitantly, the stowage box 4 is extended in a telescopic manner from the saddle member 3. The telescoping effect is provided by means of a hydraulic piston 6 fixedly mounted on the saddle member and is facilitated by means of a roller bearing assembly 9, located in the saddle member 3, which provides a location and sliding means for a rail 10 located externally on a longitudinal side of the stowage box.

FIG. 2 shows the underfloor lift in a extended, intermediate condition, with the hydraulic piston 6 fully retracted. In this condition a bridging-plate 7 and a ramp stop 8 are in a raised condition.

Referring to FIG. 3, the lifting means is lowered and the platform 11 is supported on the ground in a first operative condition and the ramp stop 8 is in a lowered condition, e.g. to receive a wheelchair or the like.

Referring to FIG. 4, the platform 11 is raised to a second operative condition by lifting arms 12 and 13, and is supported for pivotal movement by lifting arms 12 and 13. As the platform 11 is raised to the position shown, the stowage box 4 is slowly retracted by extension of the hydraulic piston 6. The retraction of the stowage box 4 continues until about 50 mm from full retraction, to ensure that the lifting arms 12 and 13 do not hit the steps 14 of the coach above the stowage box 4.

This retraction of the stowage box 4 also decreases the distance between the platform 11 and the floor 15 of the coach, and therefore enables the span of the bridging-plate 7 to be correspondingly reduced.

When the platform is in a raised condition, the ramp stop 8 is deployed to prevent a wheelchair or the like from falling off the platform 11, while said platform 11 is being raised or lowered.

What is claimed is:

1. An underfloor lift for use with a vehicle, said lift comprising a saddle member fixedly mounted under the floor of said vehicle to receive a stowage box together with a load-bearing platform and a lifting mechanism for said platform, said platform and said lifting mechanism being in sliding engagement with stowage box so that they can be stowed therein, said stowage box being in sliding engagement with the saddle member, wherein the stowage box is arranged to be retracted into said saddle member, during raising of the lift thereby to decrease the distance between the load-bearing platform and the floor of the vehicle.

2. An underfloor lift according to claim 1, wherein said saddle member is substantially quadrilateral in section.

3. An underfloor lift according to claim 2, wherein said saddle member is substantially trapezoid in section.

4. An underfloor lift according to claim 1, wherein said stowage box is of complementary configuration to said saddle member.

5. An underfloor lift according to claim 1, wherein said saddle member is fixedly attached to said floor of said vehicle by means selected from the group consisting of bolts, screws, rivets and adhesives, or by welding.

6. An underfloor lift according to claim 1, wherein said stowage box is, in use, moveable substantially longitudinally relative to said saddle member.

7. An underfloor lift according to claim 1, wherein said saddle member is provided with at least one roller bearing to receive and locate said stowage box.

8. An underfloor lift according to claim 7, wherein said stowage box has at least one external rail, said at least one external rail being engaged by said roller bearings.

9. An underfloor lift according to claim 6, wherein said longitudinal movement of said stowage box relative to said saddle member is achieved by means selected from the group consisting of hydraulically-actuated pistons, pneumatically actuated pistons, and rack and pinion assemblies mounted on said saddle member.

10. An underfloor lift according to claim 1, wherein said lifting mechanism is slidably extended from and received into said stowage box by means selected from the group consisting of hydraulically-actuated pistons, pneumatically-actuated pistons, and gear systems in operative association with said stowage box.

11. An underfloor lift according to claim 1, wherein said load bearing platform is supported on said lifting mechanism for pivotal movement.

12. An underfloor lift according to claim 6, wherein said movement of said stowage box inwardly of said saddle member enables said load bearing platform, when raised to the level of an entrance of a vehicle, to be deployed at a relatively short distance from said vehicle.

13. An underfloor lift according to claim 12, wherein a bridging plate is deployed relative to said platform by means selected from the group consisting of electric motors, hydraulically-actuated pistons, and pneumatically-actuated pistons.

14. An underfloor lift according to claim 13, wherein said load bearing platform further comprises a ramp stop.

15. An underfloor lift according to claim 14, wherein said ramp stop is operated by means selected from the group consisting of electric motors, hydraulically-actuated pistons and pneumatically-actuated pistons.

16. An underfloor lift according to claim 12 in which said load bearing platform comprises a short bridging plate which spans a gap between said load bearing platform and said vehicle.

17. An underfloor lift for use with a vehicle, said lift comprising a saddle member fixedly mounted under the floor of said vehicle to receive a stowage box together with a load-bearing platform and a lifting mechanism for said platform, said platform and said lifting mechanism being in sliding engagement with said stowage box so that they can be stowed therein, said stowage box being in sliding engagement with the saddle member, wherein the stowage box is arranged to be retracted into said saddle member thereby to decrease the distance between the load-bearing platform and the floor of the vehicle when the platform is in a raised position.

* * * * *